US011586526B2

(12) United States Patent
Davis

(10) Patent No.: US 11,586,526 B2
(45) Date of Patent: Feb. 21, 2023

(54) INCIDENT WORKFLOW INTERFACE FOR APPLICATION ANALYTICS

(71) Applicant: VMware, Inc., Palo Alto, CA (US)

(72) Inventor: Hayden Davis, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/155,229

(22) Filed: Jan. 22, 2021

(65) Prior Publication Data

US 2022/0237104 A1 Jul. 28, 2022

(51) Int. Cl.
*G06F 11/00* (2006.01)
*G06F 11/36* (2006.01)
*G06F 3/0484* (2022.01)
*G06F 11/07* (2006.01)
*G06F 3/0481* (2022.01)

(52) U.S. Cl.
CPC ........ *G06F 11/3612* (2013.01); *G06F 3/0481* (2013.01); *G06F 3/0484* (2013.01); *G06F 11/0709* (2013.01); *G06F 11/0793* (2013.01); *G06F 11/3664* (2013.01)

(58) Field of Classification Search
CPC ............ G06F 11/3612; G06F 11/0709; G06F 11/0793; G06F 11/3664; G06F 11/3466; G06F 11/3438; G06F 11/349; G06F 11/0706; G06F 11/362; G06F 11/3636; G06F 11/3644; G06F 11/3656; G06F 11/366; G06F 11/1625; G06F 11/3041; G06F 11/3089; G06F 11/321
See application file for complete search history.

(56) References Cited

U.S. PATENT DOCUMENTS

| 8,321,526 B2 | 11/2012 | Raleigh |
| 8,917,854 B2 | 12/2014 | Castellani |
| 9,374,369 B2 | 6/2016 | Mahaffey |
| 9,799,043 B2 | 10/2017 | Jain |
| 9,967,351 B2 | 5/2018 | Maheshwari |

(Continued)

FOREIGN PATENT DOCUMENTS

| AU | 2014363926 | 8/2015 |
| CN | 111314491 A | 6/2020 |
| WO | WO2015199609 | 12/2015 |

OTHER PUBLICATIONS

VMware, Manage NSX Intelligence Alarm States, Mar. 23, 2020, https://docs.vmware.com/en/, 3 pages (Year: 2020).*

(Continued)

*Primary Examiner* — Katherine Lin
(74) *Attorney, Agent, or Firm* — Clayton, McKay & Bailey, PC

(57) ABSTRACT

Examples herein include an incident workflow graphical user interface ("GUI") that visualizes workflows for solving application performance issues. An analytics server can process alerts based on application performance notifications. An administrative console GUI can display an issue pane that organizes alerts and remedial actions of an individual underlying issue. Alerts can be organized in a first region with actions organized in a second region. The alerts can visually update as they become resolved. Issue assemblies can be stored for future retrieval, allowing a recommendation engine to help populate future issue panes based on similar issues.

20 Claims, 4 Drawing Sheets

(56) References Cited

U.S. PATENT DOCUMENTS

| | | |
|---|---|---|
| 10,353,559 B2 | 7/2019 | Schaerges |
| 10,824,536 B1 | 11/2020 | Vyas |
| 11,018,967 B2 | 5/2021 | Cohen |
| 11,055,417 B2 | 7/2021 | Bhatia |
| 11,144,038 B2 * | 10/2021 | Stump ................. G06F 11/0793 |
| 11,165,800 B2 | 11/2021 | Thampy |
| 2002/0198984 A1 | 12/2002 | Goldstein |
| 2003/0065986 A1 | 4/2003 | Fraenkel |
| 2004/0158132 A1 | 8/2004 | Zaleski |
| 2007/0079355 A1 | 4/2007 | Chand |
| 2009/0327151 A1 * | 12/2009 | Carlson ................. G09B 29/007 705/14.23 |
| 2012/0069131 A1 | 3/2012 | Abelow |
| 2013/0263242 A1 | 10/2013 | Jain |
| 2014/0033055 A1 | 1/2014 | Gardner |
| 2014/0059599 A1 * | 2/2014 | Sirpal ..................... G06F 3/017 725/37 |
| 2014/0282252 A1 | 9/2014 | Edwards |
| 2015/0127819 A1 | 5/2015 | Cimino |
| 2016/0028833 A1 | 1/2016 | Georgieva |
| 2016/0294606 A1 | 10/2016 | Puri |
| 2017/0337287 A1 | 11/2017 | Gill |
| 2018/0375886 A1 | 12/2018 | Kirti |
| 2019/0098037 A1 | 3/2019 | Shenoy, Jr. |
| 2019/0138964 A1 | 5/2019 | Morita |
| 2019/0212904 A1 | 7/2019 | Geller |
| 2019/0306044 A1 | 10/2019 | Cohen |
| 2020/0045519 A1 | 2/2020 | Raleigh |
| 2020/0128047 A1 | 4/2020 | Biswas |
| 2020/0234356 A1 | 7/2020 | Rembert |
| 2020/0274784 A1 | 8/2020 | Sharma |
| 2020/0366747 A1 | 11/2020 | Bordia |
| 2021/0034495 A1 | 2/2021 | Venkatraman |
| 2021/0286510 A1 | 9/2021 | Tyler |
| 2021/0318893 A1 | 10/2021 | Zhang |
| 2021/0409403 A1 | 12/2021 | Lewin |
| 2022/0078007 A1 | 3/2022 | Reddem |

OTHER PUBLICATIONS

Brijsh, Firebase Crashlytics, Nov. 29, 2017, https://web.archive.org/, 7 pages (Year: 2017).*

"Color transition in slider bar, Oct. 2018", Qualtrics XM community forum, (https://community.qualtrics.com/XMcommunity/discussion/2269/color-transition-in-slider-bar) (Year: 2008).

* cited by examiner

INCIDENT WORKFLOW INTERFACE FOR APPLICATION ANALYTICS

BACKGROUND

Application analytics platforms allow administrators to monitor application performance. This can be especially important in an enterprise environment, where workers are using applications in their day-to-day tasks. In large enterprises, it can be difficult to know when certain issues are plaguing the workforce and decreasing workforce efficiency. When software issues are decreasing productivity, the speed with which the issues are recognized and resolved becomes paramount.

Current systems allow for tracking application errors across enterprise devices. However, it is difficult to make sense of tens of thousands of alerts received across thousands of devices. Administrators are often left dealing with issues with individual users and have few tools to identify and remediate an underlying issue that may be related to what appear to be numerous different alerts. Current graphical user interfaces ("GUIs") allow for tracking numbers of alerts but do not provide many options for visualizing alerts in a way that helps solve an underlying issue.

Additionally, even when administrators eventually solve an underlying issue, current systems do not store the solution in any way that allows for intuitive retrieval and reuse when similar issues arise. As a result, similar issues may still require trial-and-error remedial approaches, wasting valuable time. It is impossible for administrators to remember all the different remedial actions that worked on similar issues in the past.

As a result, a need exists for an incident workflow interface for application analytics, particularly an interface that visualizes alerts and remedial actions in an issue resolution workflow such that successful workflows can be rapidly identified and repeated in the future.

SUMMARY

Examples described herein include systems and methods for incident workflow presentation in a GUI. The GUI can organize an issue workflow such that related alerts and actions are presented together on the screen. The workflow can be stored as an issue assembly for later retrieval. This can eliminate trial and error in solving similar issues. For example, successful remedial actions can be suggested for similar issues and the visual organization can allow administrators to quickly understand the impacts of a prior, similar issue and how that issue was previously resolved.

In one example, an analytics server can generate alerts based on notifications regarding application performance on multiple user devices. The alerts can be generated based on comparing notifications to application metrics. For example, if a threshold percentage of user sessions end in crashes, an alert related to an application's crashes can be generated.

The analytics server can also display a GUI that includes an issue pane. The issue pane can visualize workflow for a first issue by including an alert region and an action region in the pane. The alert region can display multiple alerts that are assigned to the first issue. For example, alerts can be dragged into the alert region by a user. Additionally, based on existing alerts or issue characteristics, a recommendation engine can suggest connecting other active alerts that exist at the analytics server to the first issue. The suggested alerts can then be visualized in the alerts region also. The recommendation engine can execute on the analytics server and can incorporate a machine-learning model for making the recommendations, in an example.

The action region can display remedial actions that are assigned to the first issue. The actions can be created by the administrator to represent remedial actions that have been attempted or that will be attempted. In addition, the recommendations engine can suggest remedial actions based on similar past issues with stored issue assemblies.

The workflow of the issue pane can be stored and persist even after the first issue is resolved. An issue assembly for the first issue can memorialize the first and second alerts and remedial actions that are associated with the first issue. This can allow an administrative user to recall historical issue workflows to determine how to address similar new issues. Also, the recommendation engine can use the stored issue assemblies to recommend alerts and actions for future issue workflows that are visualized in the issue pane.

For example, when a second issue is associated with the first issue, the GUI can display the second issue in the issue pane. The action region can include a suggested remedial action from the first issue, in an example. In one example, the recommendation engine can recognize similar issues based on similar alerts assigned to both issues.

In an example, a first remedial action displayed on the issue pane corresponds to a widget. Selecting the action can then cause the widget to execute. The widget can cause a script to run or an update to occur to one or more applications or user devices.

The issue pane can then update visually to allow the administrator to track the workflow. For example, the GUI can change a color coding of the first and second alerts in an instance where the first and second alerts are no longer active. For example, if a first alert resolves after the widget executes, the first alert can highlight green or visually update some other way. In addition, the GUI can change a color coding of the remedial action based on the remedial action successfully executing and at least one of the first and second alerts no longer being active.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

An analytics server can receive notifications regarding application performance from many user devices. These notifications can be used to create alerts, such as if a certain screen in an application crashes more than five percent of the time. The analytics server can provide a console GUI that can visualize an issue in a way that connects related alerts and potential remedial actions for fixing the issue.

In one example, the GUI can include an issue pane where alerts and actions related to that issue can be collected and shown at once. A user can assign alerts to an issue, such as by investigating individual alerts. The user can drag alerts from multiple different applications into an alert region on the pane. Similarly, when an administrator attempts a remedial action, an icon representing the action can be added to an action region in the issue pane. The alerts and actions can be stored together with the issue as an issue assembly. This can allow other administrators to open the issue and see what has been done already to fix it, and what alerts are being caused by the issue. Storage of the issue assembly can allow for historical tracking of the addition and removal of alerts and actions.

In addition, a recommendation engine of the analytics server can recommend other alerts and remedial actions based on recognizing the issue. For example, if a second issue is similar to a first issue, actions and alerts from the first issue can be retrieved and displayed in the issue pane for the second issue. This can help an administrator quickly understand the impact of the issue and potential remedial actions. In one example, when the administrator selects a remedial action in the GUI, a widget can execute to launch the remedial action.

The remedial action can be automated and cause a server to update a backend or client portion of one or more applications. The automated update can be sent to user devices in an enterprise, in an example. For example, the user devices can be enrolled in a Unified Endpoint Management ("UEM") system that sends the update to applicable enrolled devices.

Figure 1:
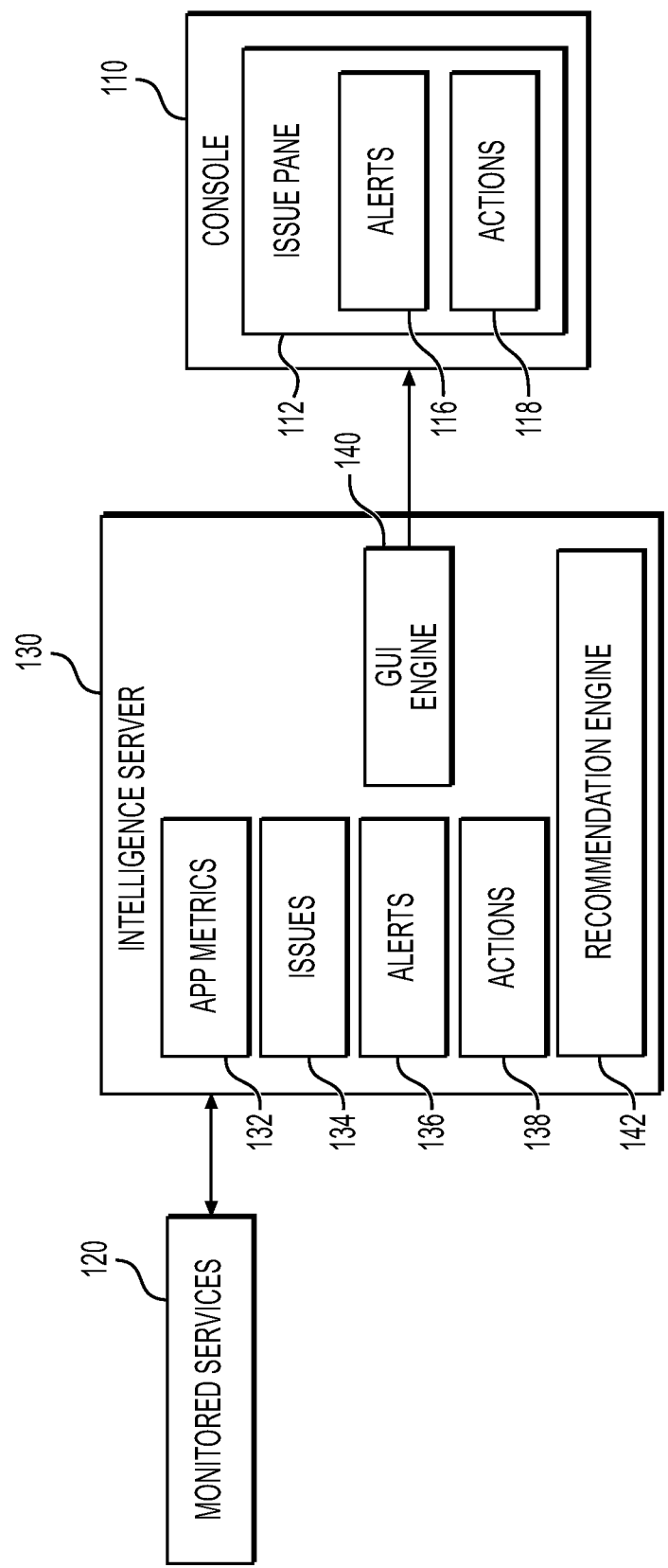
FIG. 1 is an illustration of an example system for performing application analytics using an incident workflow interface.

FIG. 1 is an illustration of an example system for performing application analytics using an incident workflow interface. Several monitored services 120 can send notifications to an analytics server 130, also identified as an intelligence server in FIG. 1. The monitored services 120 can be application services. For example, applications running on multiple user devices can be monitored by services running on those user devices or by the applications themselves. For example, applications can log and report usage statistics, such as when and for how long a user used the application in the foreground of their user device display. In addition, crashes, freezes, and other unexpected errors can be captured and reported as notifications. The services 120 that report the notifications can be preset to communicate with the analytics server. For example, the applications can either communicate with the server 130 or with an application server, where a notification service then forwards notifications to the analytics server 130. Although applications are referred to throughout this disclosure for convenience, the examples can operate with any type of service and are not limited only to applications. Further, applications can include stand-alone applications, services that monitor applications, and services that execute as part of an operating system ("OS").

The user devices that run the applications and other services 120 can be any processor-enabled device, such as a phone, tablet, laptop, or personal computer. The analytics server 130 can be one or more physical servers that have at least one hardware-based processor. The monitored services 120 can communicate over a network, such as the internet, with the analytics server 130.

The analytics server 130 can receive notifications and apply metrics 132 to those notifications in determining whether an alert is warranted. Application metrics 132 can specify when to issue alerts based on notifications from specific applications. The application metrics 132 can cause the analytics server 130 to create an alert 136 when the application has certain types of errors during a threshold percentage of user sessions. For example, if the TEAMS application is crashing for at least five percent of users, a crash alert 136 can be created for TEAMS. Additionally, some alerts 136 can be received by the analytics server 130 from one of the monitoring services 120 or from a separate application server that analyzes notifications from some applications.

Alerts 136 can be logged at the analytics server 130 for purposes of exploring issues with application performance. Because thousands of notifications can be received over a short time span, the alerts 136 can help consolidate information so that an administrator knows that some threshold level of problem exists or will soon exist.

The analytics server 130 can include a GUI engine 140 that generates the GUI of console 110. The console 110 can be accessed by administrative users who use the analytics server 130 to monitor application performance and apply remedial actions when needed. The analytics server 130 can include a webserver that an administrative user can access, such as with a user device. The webserver can cause the display of the GUI on the user device that executes the console 110.

In one example, the console 110 GUI can display an issue pane 112 that consolidates pertinent information about an underlying issue on one GUI screen. The issue pane 112 can include an alert region 116 and an action region 118 where alerts 136 and actions 138 for an issue 134 are displayed. In one example, the issue pane 112 can be used to track the various alerts 136 that appear to be associated with the issue 134. For example, an issue 134 could be that applications are crashing. Symptoms of this issue 134 can include alerts 136 that involve various applications crashing on user devices. In one example, the administrative user can organize the issue pane 112 by dragging or otherwise placing relevant alerts 136 into the alert region 116. For example, a list of alerts 136 can be displayed on one part of the console 110, allowing the user to select the alerts 136 that apply to the issue 134.

In addition, remedial actions 138 can be tracked by the analytics server 130. These can include system or application updates, settings changes, parameter edits, and any other attempt to change the operation of a user device to fix an underlying issue 134. In one example, the issue pane 112 of the console can include an action region 118 where remedial actions 138 associated with the issue 134 can be displayed. To display the remedial actions 138, the issue pane 112 can use icons with short descriptions of the action 138. Additionally, the icons can be colored differently based on whether the actions 138 have been attempted, were successful, or are suggested.

The issue 134, alerts 136, and actions 138 that are displayed together in the issue pane 112 can also be stored together by the analysis server 130. For convenience, this association of an issue 134 with its corresponding alerts 136 and actions 138 is referred to herein as an issue assembly.

The issue assembly can be stored automatically and updated based on user interaction with the issue pane 112. For example, if additional actions 138 are attempted or new alerts 136 are added, the issue assembly can be updated accordingly. The issue assembly can also include a historical record of the various changes.

A recommendation engine 142 can execute on the analytics server 130 to recognize new issues as being related to stored issue assemblies. Then, based on the actions 138 in the related issue assemblies, the recommendation engine 142 can suggest actions for the new issue. Further, if a first issue for application crashes is resolved, the recommendation engine 142 can determine which of the actions in the corresponding issue assembly most likely led to the resolution. To do this, the recommendation engine 142 can analyze when (e.g., date and time) each action was attempted in comparison to when the corresponding alert types decreased. The recommendation engine 142 can also attempt to discern series of actions 138 based on the targets for those actions. Potential targets can include specific applications, an OS, drivers, and firmware in an example. If a new application version requires an OS update, then actions 138 for both updated the OS and the application can display. Corresponding actions 138 stored in the issue assembly for the first issue 134 can be recommended as suggested actions 138 for the related second issue 134. The issue pane 112 for the second issue 134 can then include icons for the recommended actions 138 that were present in the issue assembly for the first issue 134.

In one example, where many issue assemblies include issues 134 with similarities to a second issue 134, the recommendation engine 142 can determine which actions 136 were both prevalent and successful. The recommendation engine 142 can determine action prevalence by counting the actions. Success can be based on the timing of the action 138 relative to a decrease in alerts 136, as mentioned before. Success of an action 138 can also be explicitly confirmed by the administrative user, in an example. For example, using the issue pane 112, the administrator can select an action 138 and flag it as a success. This can allow the recommendation engine 142 to assume that such actions 138 should be repeated for similar issues 134.

The recommendation engine 142 can also utilize a machine learning ("ML") model to establish relatedness between old and new issues 134. The ML model can consider alert types, number of alerts 136, impacted services, and attempted remedial actions 138 as inputs. An issue type, such as crashes, low usage, slow loading, and others can also be selected in an example to help identify related issues. The output of the ML model can be one or more issue identifiers. Corresponding stored issue assemblies can be retrieved for purposes of recommending remedial actions 138 that are stored with those issue assemblies.

The issue assemblies can be stored in any physical, non-transitory, computer-readable medium, such as on a hard drive or solid-state drive. A database can also track the various relationships of issues 134 to alerts 136 and actions 138, as well as historical information about all three items 134, 136, 138. The user that performed an action 138 can also be stored as part of this information such that a different administrative user can know who to contact if they have questions about running a particular remedial action 138 for a similar issue 134.

The GUI of the console 110 can also allow an administrator to search issue assemblies to identify similar issues 134, in an example. The recommendation engine 142 can prompt the administrator to do so, in an example, so that the recommendation engine 142 can make additional decisions about which other issue assemblies may be useful in assisting with a new issue 134.

Additionally, when a user is creating a new issue 134 on the issue pane 112, such as by adding alerts 136 to the alert region 116, the recommendation engine 142 can identify stored issue assemblies with similar alert 136 configurations and prompt the user regarding whether the new issue 136 is related to those issue assemblies.

In one example, remedial actions 138 can be carried out by a management server of the UEM system. The analytics server 130 can be part of the management server or a separate server or servers, depending on the example. The user devices can include a management application that can communicate with and receive communications from the management server. The management application can be a stand-alone application, part of an enterprise application, or part of an operating system of the user devices.

The management application can collect information about managed application performance, application usage, and device performance in an example. The management application can report notifications to the analytics server 130, in an example. For example, the management application can monitor at least managed applications and report notifications about the user experience, including application usage, performance, and user behavior data. In addition, the management application can allow for UEM management of user devices based on compliance and security settings at the management server. A management service on the management server can be responsible for handling device management for the UEM. The management application can enforce compliance at the user devices, such as by wiping enterprise data when compliance standards are not met. The management server can also control which versions of managed applications are installed at the user devices.

In an example, services 120 on the user device, such as the management application or a managed application, can send notifications to the analytics server 130. In an example, the management application on the user devices can collect data on how the application is performing on that user device. For example, the management application can collect data on usage rates, crash rates, network error events, network latency, application response time, application loading time, user flow failures, and CPU and memory utilization. The management application can also collect information on the health of the user device, such as battery health, operating system crashes, boot time, shutdown time, and available storage. The management application can send this information to the management server or to the analytics server 130. In an example, the management application can send the application data and device health information as one or more data files using an Application Program Interface ("API") call or an Internet protocol, such as hypertext transfer protocol ("HTTP"), simple object access protocol ("SOAP"), representational state transfer ("REST"), and/or other protocols.

In an example, the analytics server 130 can use the application data and device health information to determine user experience scores. For example, the analytics server 130 can determine a mobile user experience score, desktop user experience score, and a device health experience score. The analytics server 130 can also identify the lowest of the three scores as an overall user experience score. These scores can be determined for each user, application, group, or organization. The scores can then be presented in a scoring GUI. For example, the scores and their corresponding data can be provided to a GUI engine 140. The GUI engine 140 can generate a scoring GUI that displays the user experience score information. The scores can also be used as part of metrics 132 for generating alerts 136.

In an example, the admin console 110 can allow an admin user to reconfigure the parameters for the user experience scores. The admin console 110 can be a device, application, or interface accessible by an admin user. The GUI engine 140 can provide the GUI to the console 110, which an admin user can use to reconfigure the user experience scoring and the metrics 132 for generating alerts 136, in an example. For example, the administrator can change parameters for how each experience score is determined or for when alarms should be raised based on applications having threshold scores. The GUI engine 140 can receive the reconfiguration data and modify the scoring and metrics 132 accordingly.

Figure 2:
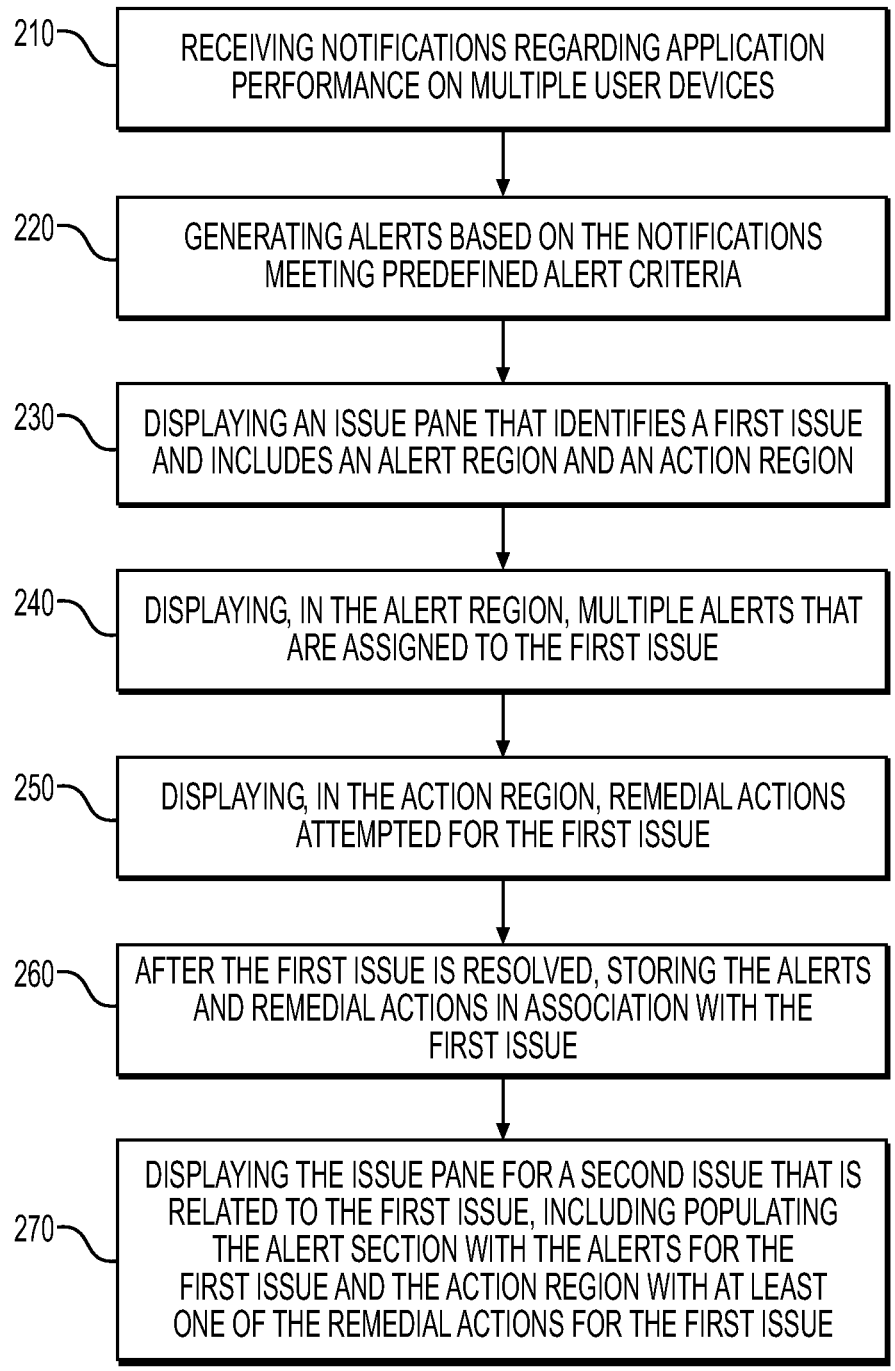
FIG. 2 is a flowchart of an example method for application analytics using an incident workflow interface.

FIG. 2 is a flowchart of an example method for application analytics using an incident workflow interface. At stage 210, the analysis server can receive notifications regarding application performance on multiple user devices. The notifications can be based on any activity or performance tracked for a service 120, including application services. Notifications can be generated for performance data like errors, hang times, and crashes. User devices can collect and send data to a server 130 about an application installed on the devices and the health of the devices.

In one example, a user device enrolled in a UEM system can use a device management protocol for sending notifications about the device, managed applications, and user interactions with both. A management application that is either stand-alone, part of the operating system, or part of the managed applications can collect and send usage and performance information in the form of notifications. In one example, the management server (which can include the analytics server 130) can send a command to a messaging service, such as a service for messaging APPLE devices or ANDROID devices. The command can request certain notification types, in an example. Alternatively, the command can rely on a command queue "pull" system and simply request communication from the user device. The messaging service can send the command to a user device, telling the user device to check in with the management server. When the user device checks in (such as by communicating with the management application), the user device can retrieve contents of a command queue for the management server. The commands in the command queue can request particular notification types, which the user device can then send to the analytics server 130. Therefore, notifications can be received by polling the user devices in a "pull" system, in one example. However, some managed devices can periodically send the notifications without receiving individual requests to do so from the management server.

At stage 220, the analytics server 130 or some other server can generate alerts 136 based on the notifications meeting predefined alert criteria. The criteria can include certain metrics 132 set by an administrator using the console 110 GUI, in an example. In one example, when an application score falls below a threshold, an alert 136 about poor user experience can be generated. In another example, when a threshold percentage of application sessions end in a crash over a period, such as the last hour or day, and alert 136 about application crashes can be generated. The alerts 136 can allow an administrator to know when an abnormal number of any sort of notification is being received during a period.

At stage 230, the analysis server 130 can display a GUI in console 110. Displaying the GUI can include sending instructions from a web server to any user device that ultimately renders the GUI on a screen for viewing by an administrator.

The GUI can include an issue pane 112 that is uniquely formatted for allowing an administrator to understand workflow around issues 134 that may be present with enterprise devices, applications, or other services. The issue pane 112 can identify an issue 134, such as application crashes or poor load times. The issue pane 112 can include an alert region 116 and an action region 118. These regions 116, 118 can organize the alerts 136 and actions 138 that are associated with the issue 134. This can allow an administrative user to see a useful summary of the workflow involved in both fully identifying and fixing the issue 134.

The issue 134 can be initially created by the administrator through use of options on the GUI, in an example. In another example, when the recommendation engine 142 detects enough alerts 136 of the same type, such as application crashes, the recommendation engine 142 can automatically create an issue 134. The administrator can select between open issues 134 or search through historical issues 134, in an example. In both cases, the issue 134 can be viewed in the issue pane 112 of the GUI.

Displaying the issue pane 112 in stage 230 can also include stages 240 and 250. In stage 240, the alert region 116 can be populated with multiple alerts 136 that are assigned to the issue 134. Alerts 136 can be assigned to an issue 134 by administrator selection in one example. For example, an administrator can view a list of alerts 136, which can be grouped in the GUI according to alert type and similarity. In one example, the alerts 136 are grouped according to type and source, such that alerts 136 about crashes can be viewed together and alerts 136 about a particular application's performance can be viewed together. The administrator can then use the GUI to select desired alerts 136 for addition to the alert region 116 of the issue pane 112. The administrator can use the GUI to drag the alerts 136 into the alert region 116, in an example. The administrator can also arrange the icons representing the alerts 136 in the alert region 116, in an example. This can help the administrator to visually organize the most important alerts 136 for an issue 134 so that the administrator can easily see when those alerts 136 are resolved by a remedial action 138.

Likewise, at stage 250, the issue pane 112 can display actions 138 in the action pane 118 that are assigned to the issue 134. An administrator can assign actions 138 by creating an action icon that describes a remedial action taken to fix the issue. Some actions 138 can be automated, and widgets can be selectable for these automated actions. This can allow for the issue pane 112 itself to include executable automated actions 138 when those actions 138 are suggested in the future by the recommendation engine 142 for similar issues 134.

Displaying and organizing the alerts 136 and actions 138 together in the issue pane 112 can provide advantages over prior approaches at workflow visualization for diagnosing these issues 134. In one example, the alerts 136 and actions 138 can be represented as color-coded icons. The color coding can help convey which alerts 136 are still outstanding for the issue 134 and which actions 138 have been successful in reducing alerts 136, in an example. For example, alerts 136 that are resolved can be color coded differently than alerts 136 that remain unresolved. This can allow an administrator to easily see whether a new action 138 leads to resolution of particular alerts 136.

Likewise, actions 138 that are shown to improve or fix the issue 134 can be color coded differently than actions 138 that were attempted with results that are not yet certain to have helped. In one example, the successful action 138 can be linked to the resolved alert 136 by the administrator, which can help the recommendation engine 142 suggest viable actions 138 in the future for issues 134 that are similar (i.e., that have similar alerts 136). Suggested actions 138 can also be visually highlighted to ensure that the administrator recognizes these as recommendations from the recommendation engine 142, in an example. Selecting an action 138 can also cause alerts 136 to highlight differently to indicate which alerts 136 are expected to be impacted by the action 138.

At stage 260, the analysis server 130 can store the alerts 136 and remedial actions 138 collected in the issue pane 112 in association with the issue 134 as an issue assembly. The stored issue assembly can persist in storage even after the issue 134 itself is resolved. This can allow for the retrieval of issue assemblies so that an administrator can review which actions 138 worked in resolving which issues 134 (any by association, which types of alerts 136), in an example. For example, using the GUI, the administrator can search for past issues 134 that are similar to a new, currently existing issue 134. The search interface can allow the administrator to search for particular issue 134 types, perform a text-based search, or search for issues 134 based on which alerts 136 are present. Additionally, resolved issues 134 can be displayed again in the issue pane 112. In one example, this can allow the administrator to see if any of the alerts 136 in the alert region 116 have re-occurred. For example, the corresponding icons may now be color coded to represent that the same alert 136 currently exists again.

The recommendation engine 142 can also search the stored issue assemblies to identify similar issues 134 to a present issue 134 and to recommend remedial actions 138 that worked for similar issues 134 in the past.

At stage 270, for a current (e.g., second) issue 134 that is associated with a past (e.g., first) issue 134, the issue pane 112 can display elements of the first issue 134 such that the administrator can see how those might apply to the second issue. For example, the issue pane 112 can re-display the first issue 134, in an example. This can include re-displaying the alerts 136 and actions 138 stored in the issue assembly for the first issue 134. Alternatively, the second issue 134 can be displayed in the issue pane 112 with a suggested alert 136 or action 138 from the first issue 134. For example, if an action 138 in the first issue assembly resolved multiple of the same alerts 136 associated with the second issue 134, the recommendation engine 142 can cause the GUI to display the action 138 as a suggestion in the action region 118 or elsewhere. Clicking on the icon for the suggested action 138 can highlight which of the alerts 136 in the alert region 116 are likely to be improved based on the suggested action 138, in an example.

In another example, the suggested action 138 can be executable. For example, the icon can provide the user with the option of launching a widget to carry out an automated remedial action 138.

The remedial actions can send updates to individual user devices using the UEM system, in an example. For example, the management server (which can include the analytics server 130) can track which devices have which applications, operating systems, and so on. The management server can then schedule updates accordingly, relaying on the management application at the user devices to install updates or change parameters on the device. In one example, the management server can send a message to the messaging server responsible for sending messages to an individual device (different devices can be contacted by different messaging servers, depending on operating system and device type). The messaging server can cause the device to contact the management server and receive updates from a command queue. The management application can then process the updates in the command queue, scheduling patches, installations of new applications, operating system updates, or parameter changes within a managed application.

Figure 3:
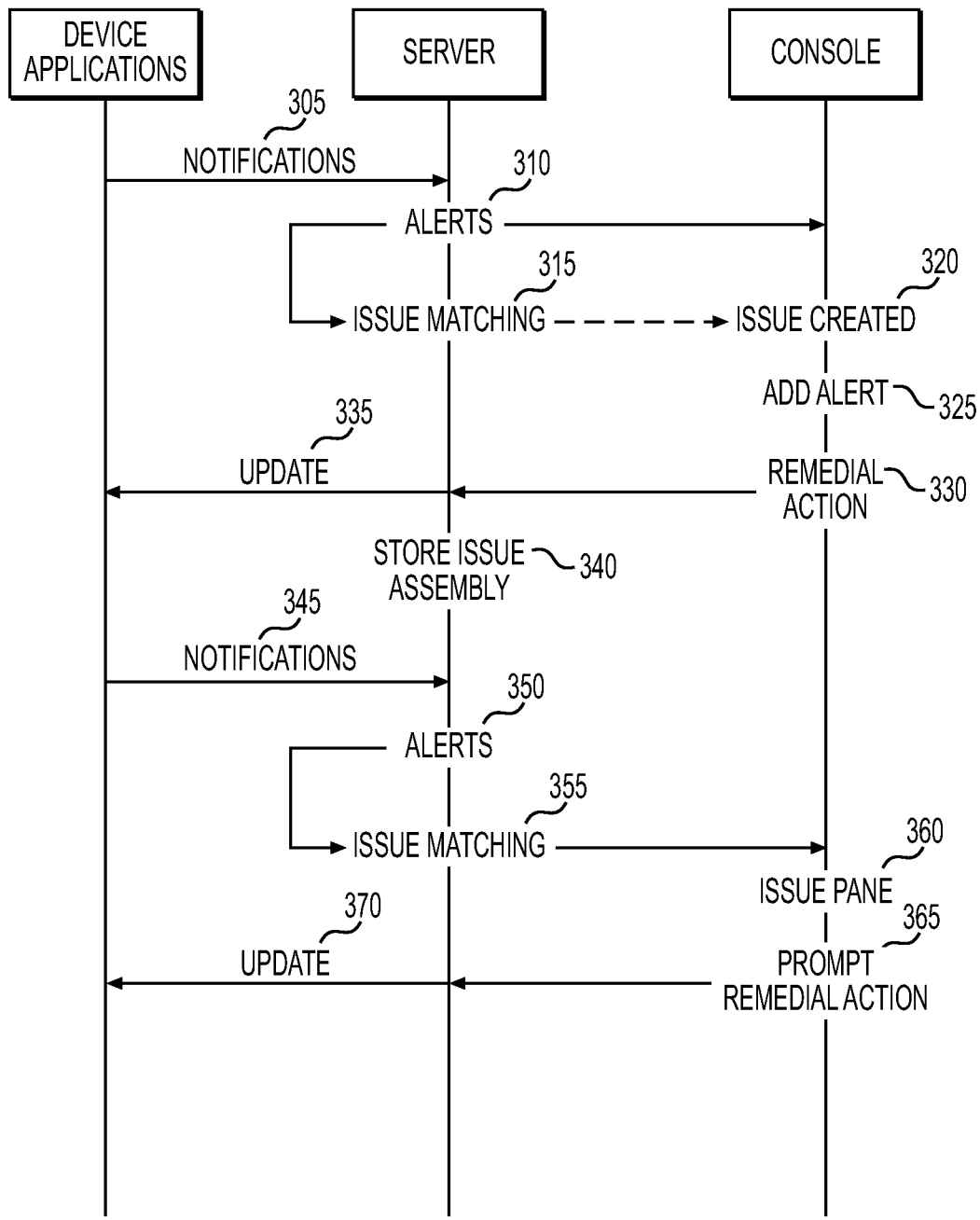
FIG. 3 is a sequence diagram of an example method for application analytics using an incident workflow interface.

FIG. 3 is a sequence diagram of an example method for application analytics using an incident workflow interface. At stage 305, user devices can send notifications regarding application performance to a server. The server can be the analytics server 130, a management server, or some other server, in an example. The server can generate alerts 136 at stage 310 based on the notifications. For example, if applications are not loading fast enough across a threshold number or percentage of user sessions, an alert 136 can be generated. Likewise, if too many user sessions end in a crash or other error, an alert 136 can be generated.

The alerts 136 can be accessed and visualized on a console GUI. The GUI can give administrators an overall view of application performance for purposes of improving the user experience and solving issues 134.

At stage 315, the server can attempt to match a combination of alerts 136 to known issues. For example, if a combination of active alerts 136 has a threshold level of similarity to alerts 136 in a stored issue assembly, the issue assembly can be used to create a new issue 134 at stage 320. The new issue 134 can include the active alerts 136 and suggested remedial actions based on the earlier issue 134 memorialized in the issue assembly. Therefore, the new (i.e., second) issue 134 can display in the issue pane 112 of the GUI and include alerts 136 and actions 138 in the alert region 116 and action region 118, respectively, that were part of the issue assembly for the earlier (i.e., first) issue.

The issue 134 matching at stage 315 can also rely on an ML model, in an example. The ML model can analyze similarity of active alerts 136 with many stored issue assemblies, also considering which shared actions between those relevant issue assemblies were important in issue resolution. The ML model of the recommendation engine 142 can propose remedial actions for the administrator to apply, in an example. The proposed remedial actions can display in the GUI.

Stage 320 can include a manual issue 134 creation in an example. If the administrative user believes there is an underlying issue 134 that is causing multiple active alerts 136, the administrator can create a new issue 134 within the GUI. At stage 325, the administrator can drag alerts 136 into the alert region 116 of the issue pane 112. While this is happening, or soon thereafter, in one example the recommendation engine 142 can consider the new combination of alerts 136 and attempt to recommend additional active alerts 136 and proposed actions 138 based on similar issue assemblies that are stored at the analytics server 130.

The proposed remedial actions 138 can be added at stage 330. In addition, the user can manually add remedial actions 138 to the action region 118 to track which actions 138 the administrator has performed or proposes performing. Actions 138 can require second administrator approval in some cases, such as when an automated update will occur. This can prevent the inadvertent launching of proposed actions 138 without oversight, in an example.

When an action 138 is launched, at stage 335 an update can occur to the relevant user devices and applications associated with the action 138. In one example, the action 138 can launch one or more widgets to automate an update. The update can include running scripts to change parameters for an application or even sending an updated version of an application to the relevant user devices. These updates can be carried out, in an example, by a management server that communicates with a management agent on the devices. For example, devices enrolled in a UEM system can receive messages from the management server, download the update, and execute the update.

In another example, the updates include queuing one or more commands or executable code blocks in a command queue at a management server of the UEM system. The user devices can be contacted through a messaging server, causing the user devices to request commands from the command queue at the management server. The user devices can then execute the commands and code locally to perform updates. When complete, the management application can inform the management server that the update was a success. This can allow the management server to ensure the update took place. The management server can set a status for the remedial action to indicate completion, causing the corresponding action icon in the issue pane 112 to change colors to indicate the completion. The change can also cause the analytics server 130 to confirm whether alerts 136 on the issue pane 112 are still active and change corresponding icons for those alerts that have been remediated.

Even after the issue is resolved, at stage 340 the issue assembly can remain stored at the analytics server 130. This can allow administrators to search a repository of issue assemblies and locate workflows for similar issues that may arise in the future. The GUI can display old issue assemblies, allowing the administrator to quickly understand the issue and workflow for responding to the combination of alerts with a combination of remedial actions. Additionally, the recommendation engine 142 can use the stored issue assemblies to recommend remedial actions 138 for future issues, based on issue similarity (e.g., similar combinations of alerts).

At stage 345, the user devices can continue to send notifications. The same applications or other services that are updated at stage 335 can continue reporting regarding performance. This again can result in alerts at stage 350, like described with respect to stage 310. Issue matching at stage 355 can then proceed as described with respect to stage 315, and new issues 134 can be created as needed.

But at stage 360, the issue pane 112 can update to reflect the completed action 138 in the action region 118 and changes to the alerts 136 in the alert region 116 can also be indicated. For example, a first of the alerts 136 can highlight green, indicating that the alert 136 is no longer active. The performed action 138 can also highlight green to indicate that the action 138 was performed and reduced or eliminated at least one alert 136. In one example, selecting the green action 138 can also cause the corresponding inactive alert 136 to be visually indicated within the issue pane 112.

Additionally, at stage 365, the GUI can prompt the user regarding another suggested remedial action 138. The suggestion can be provided by the recommendation engine 142 based on the combination of alerts 136 still active and the remedial actions 138 that have already been performed. The success of those prior actions 138 can also be considered in recommending the next one. When the suggested action is selected, the user can be prompted as to whether they would like to automate an update. If the user has the requisite permissions to do so, the update can commence at stage 370. The update at stage 370 can operate as described regarding the update at stage 335.

Figure 4:
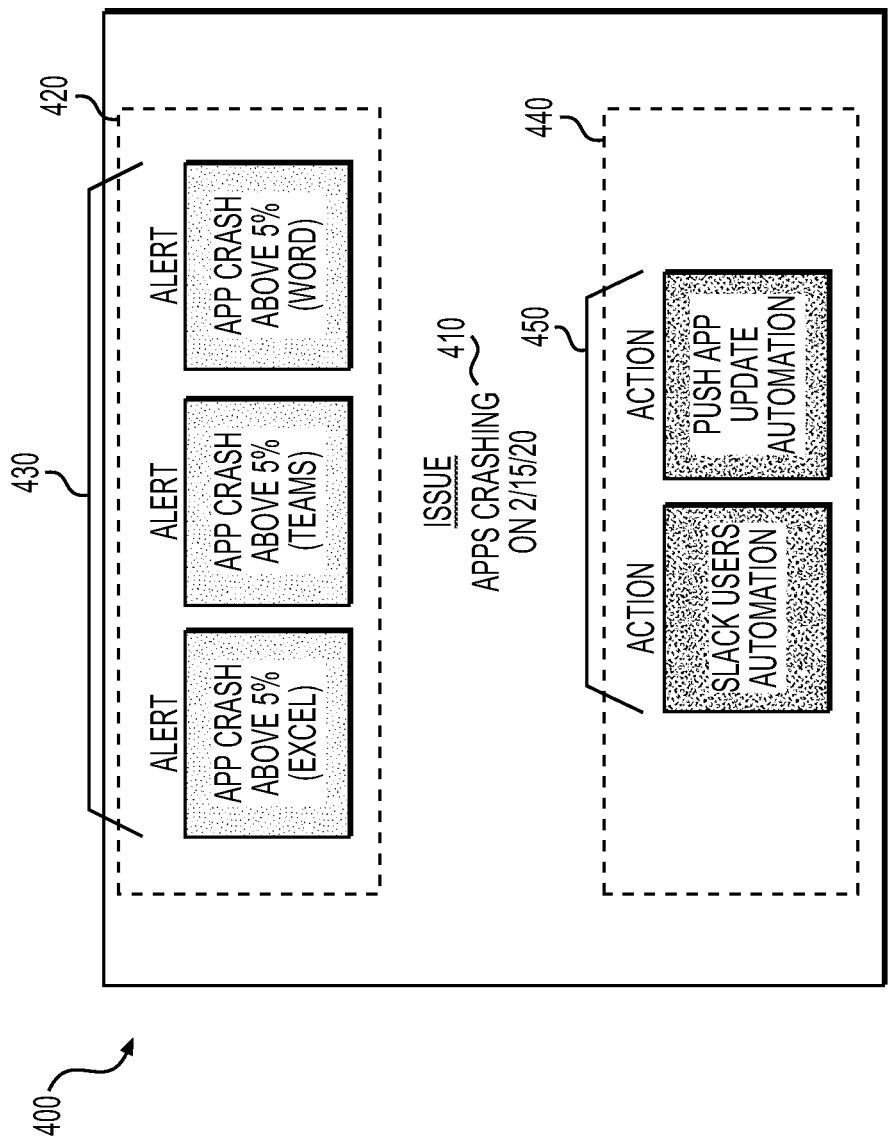
FIG. 4 is an illustration of an example graphical user interface ("GUI") that includes an issue pane for application analytics as part of an incident workflow interface.

FIG. 4 is an illustration of an example issue pane 400 for display on a GUI for application analytics. The issue pane 400 can be part of a larger incident workflow interface that is provided on the GUI, in an example. As has been described, the issue pane 400 can uniquely organize information for a particular issue 410, improving the administrative user's view of a workflow for resolving the issue 410. In this example, the issue pane 400 is presenting a workflow for an "Apps Crashing" issue for Feb. 15, 2020. On that day, it is possible that many alerts 136 were generated related to application crashes, leading the recommendation engine 142 or the administrator themselves to create the issue 410 and associate the different alerts 136 with the issue 410.

As illustrated, the issue pane 400 can include a first region 420 for displaying alert icons 430. The alert icons 430 can correspond to alerts 136 generated or received by the analytics server 130 that have been associated with the issue 410. The association can be automatic when the recommendation engine 142 recognizes the relationship and proposes adding an alert 136 to the issue 410. Alternatively, an alert 136 can be manually added to the alerts region 420 in an example. Therefore, the alert icons 430 can represent automatically or manually associated alerts 136, with a mix being possible. In the illustrated example, three alert icons 430 all relate to different applications that have crash levels above a threshold percentage. The alert icons 430 can be shaded to represent that all three alerts 136 are active and need to be resolved.

The issue pane 400 can also include an action region 440 that displays action icons 450. The action icons 450 can correspond to actions 138 that are associated with the issue 410. The actions 138 can be suggested by the recommendation engine 142 in an example, or manually added by the administrator. In this example, the action icons 450 both represent different automations that can be performed to reduce the number of applications that are crashing. The action icons 450 can be shaded to represent that these actions 138 have not yet been performed, in an example. When the actions 138 are performed, the action icons 450 can highlight differently. In addition, the interpreted success of the actions 138 can also inform how the icons 450 are highlighted.

The alert icons 430 and action icons 450 can also be removed from the issue pane 400 as the administrative user sees fit. For example, if the administrator believes certain alerts 136 or actions 138 are not actually important for the issue 410, these can be deleted or removed to keep the workflow focused on the more important information. A history can be stored as part of the issue assembly, such that changes on the issue pane 112 can be recreated or undone if needed. This can allow for reassembly of an exact workflow in the future, even when the issue pane 400 that gets displayed is a simplified visualization of the workflow.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for incident workflow visualization, comprising:
    generating alerts based on notifications regarding application performance on multiple user devices;
    displaying, on a graphical user interface ("GUI"), an issue pane, wherein the issue pane identifies a first issue and simultaneously includes an alert region and an action region;
    displaying, in the alert region, first and second alerts that are assigned to the first issue;
    displaying, in the action region, remedial actions that are assigned to the first issue, wherein the remedial actions are displayed in the action region upon display of the issue pane without requiring a switch from the alert region by a user;
    after the first issue is resolved, storing the first and second alerts and remedial actions in association with the first issue; and
    in an instance in which a second issue is associated with the first issue, displaying the second issue in the issue pane, wherein the action region includes a suggested remedial action stored in association with the first issue.

2. The method of claim 1, wherein the GUI includes an option for adding the first alert to the alert region from a set of generated alerts.

3. The method of claim 2, wherein the second alert is automatically recommended based on inclusion of the first alert.

4. The method of claim 1, further comprising prompting the user to apply the suggested remedial action to the second issue, wherein the suggested remedial action includes an automated update that is sent to multiple of the user devices.

5. The method of claim 1, wherein a first remedial action displayed on the issue pane corresponds to a widget, and wherein selecting the remedial action causes the widget to execute.

6. The method of claim 1, further comprising:
    changing a first color coding of the first and second alerts in an instance where the first and second alerts are no longer active; and
    changing a second color coding of a first remedial action based on the first remedial action successfully occurring and at least one of the first and second alerts no longer being active.

7. A non-transitory, computer-readable medium containing instructions that, when executed by a hardware-based processor, perform stages for incident workflow visualization, the stages comprising:
    generating alerts based on notifications regarding application performance on multiple user devices;
    displaying, on a graphical user interface ("GUI"), an issue pane, wherein the issue pane identifies a first issue and includes an alert region and an action region;
    displaying, in the alert region, first and second alert icons corresponding to first and second alerts, respectively, that are assigned to the first issue, wherein each of the first and second alert icons are displayed in the alert region based on a user dragging the first and second alert icons from outside the issue pane to inside the issue pane, and wherein each of the first and second alert icons include an identification of a crash rate of an application;
    displaying, in the action region, remedial actions that are assigned to the first issue;
    after the first issue is resolved, storing the first and second alerts and remedial actions in association with the first issue; and
    in an instance in which a second issue is associated with the first issue, displaying the second issue in the issue pane, wherein the action region includes as a suggested remedial action stored in association with the first issue.

8. The non-transitory, computer-readable medium of claim 7, wherein the GUI includes an option for adding the first alert to the alert region from a set of generated alerts.

9. The non-transitory, computer-readable medium of claim 8, wherein the second alert is automatically recommended based on inclusion of the first alert.

10. The non-transitory, computer-readable medium of claim 7, the stages further comprising prompting the user to apply the suggested remedial action to the second issue, wherein the suggested remedial action includes an automated update that is sent to multiple of the user devices.

11. The non-transitory, computer-readable medium of claim 7, wherein a first remedial action displayed on the issue pane corresponds to a widget, and wherein selecting the remedial action causes the widget to execute.

12. The non-transitory, computer-readable medium of claim 7, the stages further comprising:
    changing a first color coding of the first and second alerts in an instance where the first and second alerts are no longer active; and
    changing a second color coding of a first remedial action based on the first remedial action successfully occurring and at least one of the first and second alerts no longer being active.

13. A system for incident workflow visualization, comprising:
    a memory storage including a non-transitory, computer-readable medium comprising instructions; and
    a hardware-based processor that executes the instructions to carry out stages comprising:
        generating alerts based on notifications regarding application performance on multiple user devices;
        displaying, on a graphical user interface ("GUI"), an issue pane, wherein the issue pane identifies a first issue and includes an alert region and an action region;
        displaying, in the alert region, first and second alerts that are assigned to the first issue;
        displaying, in the action region, remedial actions that are assigned to the first issue;
        after the first issue is resolved, storing the first and second alerts and remedial actions in association with the first issue; and
        in an instance in which a second issue that is associated with the first issue, displaying the second issue in the issue pane, wherein the action region includes a suggested remedial action stored in association with the first issue, the suggested remedial action being displayed in the action region upon display of the issue pane without requiring a switch from the alert region by a user,
    wherein the notifications are associated with different types of applications that execute on the user devices, and the alerts are generated based on performance metrics for the different types of applications.

14. The system of claim 13, wherein the GUI includes an option for adding the first alert to the alert region from a set of generated alerts.

15. The system of claim 14, wherein the second alert is automatically recommended based on inclusion of the first alert.

16. The system of claim 13, the stages further comprising prompting the user to apply the suggested remedial action to the second issue, wherein the suggested remedial action includes an automated update that is sent to multiple of the user devices.

17. The system of claim 13, the stages further comprising:
   changing a first color coding of the first and second alerts in an instance where the first and second alerts are no longer active; and
   changing a second color coding of a first remedial action based on the first remedial action successfully occurring and at least one of the first and second alerts no longer being active.

18. The method of claim 1, wherein the notifications are associated with different applications that execute on the user devices, and the alerts are generated based on performance metrics for the different applications.

19. The non-transitory, computer-readable medium of claim 7, wherein the identifications of crash rates included in the first and second alert icons correspond to crash rates of different types of applications.

20. The non-transitory, computer-readable medium of claim 7, wherein the notifications are associated with different applications that execute on the user devices, and the alerts are generated based on performance metrics for the different applications.

\* \* \* \* \*